UNITED STATES PATENT OFFICE.

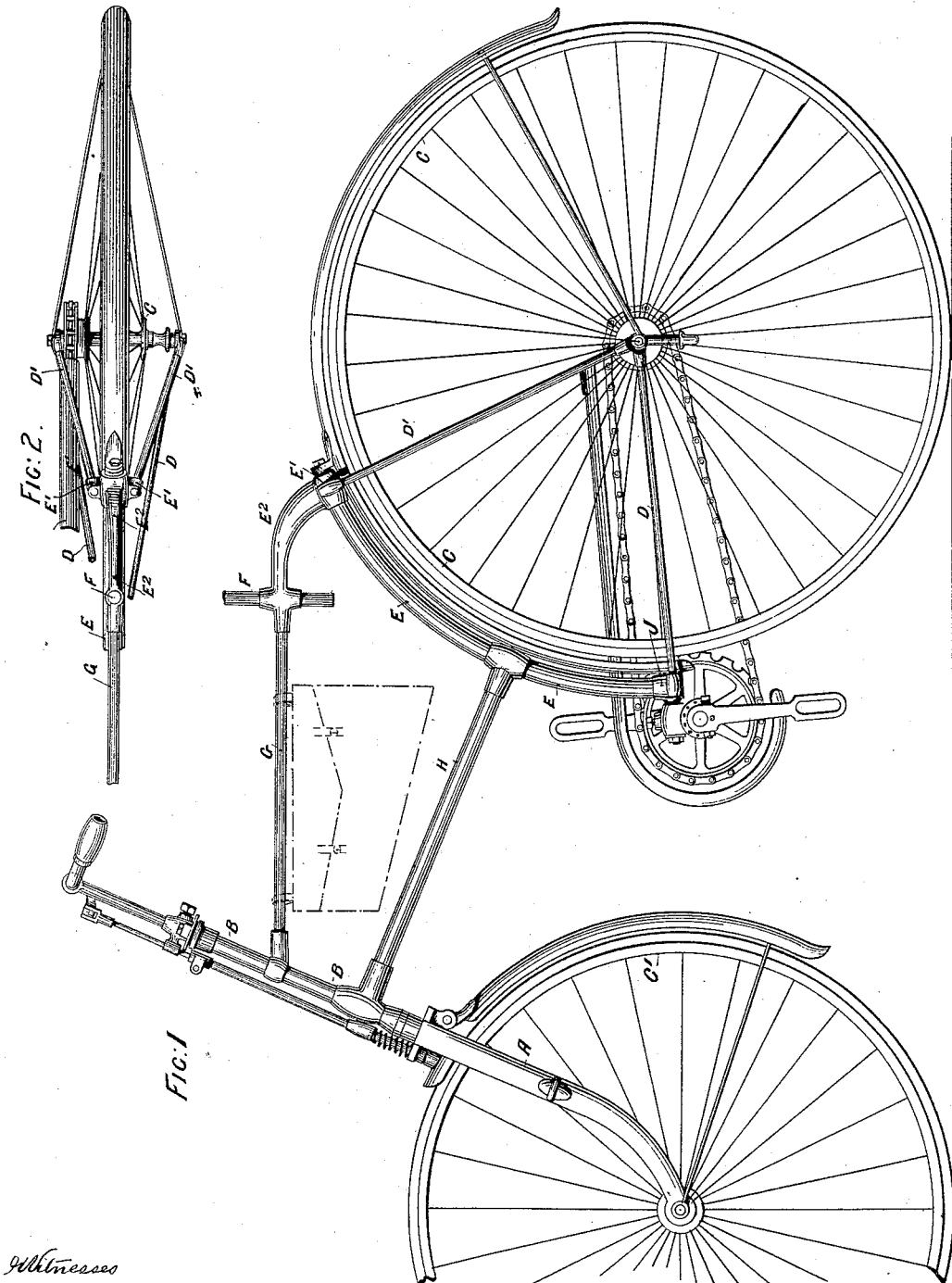

GEORGE SINGER, OF COVENTRY, ENGLAND.

VELOCIPEDE.

SPECIFICATION forming part of Letters Patent No. 444,141, dated January 6, 1891.

Application filed March 24, 1890. Serial No. 345,068. (No model.) Patented in England July 9, 1888, No. 9,966.

*To all whom it may concern:*

Be it known that I, GEORGE SINGER, cycle-manufacturer, a subject of the Queen of Great Britain, residing at Coventry, in the county of Warwick, England, have invented certain new and useful Improvements in Velocipedes, (for which a patent has been granted to me in Great Britain bearing date July 9, 1888, No. 9,966,) of which the following is a specification.

My invention relates to improvements in the tubular frames of velocipedes of the now well-known Safety type, having front steering and rear driving wheels, by means of which the strength and stiffness are greatly increased, and by which the adaptability for carrying luggage is augmented.

In the drawings, Figure 1 is an elevation of a velocipede containing my improvement, and Fig. 2 is a partial plan view.

A represents the steering-fork, and B the socket or tubular head in which the spindle of the steering-fork turns.

C is the driving-wheel, and C' the steering-wheel, and these parts, together with the handle-bar, brake, mud-guards, chain sprocket-wheels, cranks, crank-shaft, and bearings, which are also shown, are of well-known construction and do not require further description.

My improved frame is composed of the diverging pairs of tubes D D', the large curved arc tube E, the main tube H, the bracket E' and its arm E², the tube G, and the bracket J. The curved tube E is of large diameter, and is the arc or segment of a circle conforming with that of the wheel C, but of larger radius. The main tube H is inclined and connected at its forward end with the socket B and at its back end with the curved tube E near the middle. Upon the lower end of the curved tube E is a bracket J, having side lugs to receive the forward ends of the diverging tubes D. The bracket J also carries the bearings for the crank-shaft. At the upper end of the curved tube E is secured a bracket E', and the forward-projecting arm E² is formed with said bracket. Upon the sides of the bracket E' are lugs to receive the forward upper ends of the diverging tubes D', and the back ends of the pairs of diverging tubes D D' come together and are united to hubs carrying the axle of the rear driving-wheel C. The forward end of the bracket-arm E² has a socket for the vertically-placed saddle-post F, and a tube or rod G, of smaller diameter than the main tube H, extends between and is secured to the socket B and bracket-arm E².

Between the tubes G and H and suspended from the tube G, I have shown by dotted lines a luggage carrier or satchel, there being in my improved form of frame at this point ample room for carrying a luggage-holder, which is especially desirable in Safety bicycles or velocipedes used for touring and for military purposes.

My improved velocipede-frame is pleasing in appearance, graceful in outline, and possesses great strength and stiffness with moderate weight.

I claim as my invention—

1. The combination, in a front steering and rear driving wheel velocipede, with the socket B, of the bent arc tube E, the main tube H, connected to the socket B and to the tube E near the middle thereof, the brackets J and E', arm E², and diverging pairs of tubes D D', substantially as set forth.

2. The combination, in a front steering and rear driving wheel velocipede, with the socket B, of the bent arc tube E, the main tube H, connected to the socket B and to the tube E near the middle, the brackets J and E' at the respective ends of the tube E and having side lugs, the diverging pairs of tubes D D', the bracket-arm E², and tube or rod G, substantially as set forth.

3. The combination, in a front steering and rear driving wheel velocipede, with a main inclined tube, of a bent arc tube conforming to the driving-wheel and connected to the main tube at a point intermediate to its respective ends, brackets at the ends of the bent tube and having side lugs, to which are connected the tubes of the frame extending to the axle of the driving-wheel, the lower bracket carrying the bearings of the crank-shaft and the upper bracket carrying the saddle-post, substantially as set forth.

GEORGE SINGER.

Witnesses:
C. H. HORSWILL,
ARTHUR POOLE,
    *Clerks.*